(12) United States Patent
Kilmartin

(10) Patent No.: US 6,951,145 B2
(45) Date of Patent: Oct. 4, 2005

(54) NON-CONTACT THRUST FORCE SENSOR ASSEMBLY

(75) Inventor: Brian David Kilmartin, Cheshire, CT (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 59 days.

(21) Appl. No.: 10/790,963

(22) Filed: Mar. 2, 2004

(65) Prior Publication Data

US 2004/0187607 A1 Sep. 30, 2004

Related U.S. Application Data

(60) Provisional application No. 60/457,129, filed on Mar. 24, 2003.

(51) Int. Cl.[7] .............................. G01L 3/02; G01L 5/12
(52) U.S. Cl. ................................ 73/862.333; 73/862.49
(58) Field of Search ......................... 73/862.333, 862.49

(56) References Cited

U.S. PATENT DOCUMENTS

| | | | |
|---|---|---|---|
| 4,182,168 A | * | 1/1980 | Desch ..................... 73/862.49 |
| 4,823,617 A | * | 4/1989 | Hase et al. ............. 73/862.335 |
| 5,889,215 A | | 3/1999 | Kilmartin |
| 6,330,833 B1 | | 12/2001 | Opie |
| 6,516,508 B1 | | 2/2003 | Gandarillas |
| 6,598,491 B2 | | 7/2003 | Opie |

\* cited by examiner

*Primary Examiner*—M. Noori
*Assistant Examiner*—Lilybett Martir

(57) ABSTRACT

A non-contact sensor assembly measures an in-line driving thrust force that is applied to a rotating shaft. The sensor assembly includes a hollow torque-shaft with a magnetoelastic element and a thrust shaft that is inserted within the hollow torque-shaft. Keys are formed on thrust shaft and keyways are formed on the hollow torque-shaft. The keys are received within the keyways to lock the thrust shaft and hollow torque-shaft together but still permit a small amount of axial movement between the shafts. Helical spline recesses are formed on the thrust shaft and corresponding spline projections are formed on the hollow torque-shaft. The projections are received within the recesses to translate the thrust force into a twisting force. A magnetometer cooperates with the magnetoelastic element to measure the amount of twisting force and determine the amount of thrust force.

20 Claims, 2 Drawing Sheets

NON-CONTACT THRUST FORCE SENSOR ASSEMBLY

The application claims priority to U.S. Provisional Application No. 60/457,129, which was filed on Mar. 24, 2003.

BACKGROUND OF THE INVENTION

Thrust force sensors are used to measure in-line thrust or driving forces exerted on a rotating rod or shaft within rotary machines, in static systems, in vehicle powertrains, or in other various known applications. These sensors must be capable of operating within the harsh conditions common to industrial machinery and vehicle applications. Traditionally, these thrust force sensors are contact sensors that utilize brushes and commutators to generate signals representative of the thrust force applied to the rod or shaft. One disadvantage with these contact sensors is that they have difficulty operating in the harsh environmental conditions. Dirt, water, and other contaminants adversely effect the operation of the brushes, resulting in reduced accuracy of the thrust force measurements.

Another disadvantage with traditional contact thrust force sensor assemblies is that there is often rotational speed limits imposed as part of the operating criteria for the sensor assembly. In other words, the contact sensor assembly can only be used within a certain rotational speed operating range. If the rotational speed of the rotating shaft exceeds an upper limit of this speed operating range, the sensor may not operate accurately, or may come apart or shatter at excessive rotational speeds.

Thus, there is a need for thrust force sensors that can withstand excursions well beyond traditional full-scale measurement ranges, and which can operate in harsh environmental conditions. The sensors should be durable, reliable, and capable of operating in various applications. For example, the sensor should be easily incorporated into processing machine applications, in which rotating work pieces are subjected to either compressing or drawing operations. The sensor should also be easily incorporated into vehicle applications. For example, measuring the force compressing clutch plates would result in beneficial data such as degree of engagement, coupling characteristics, and power transfer characteristics. Further, measuring forces exerted on vehicle suspension struts would improve compensation control for ride stability.

SUMMARY OF THE INVENTION

A non-contact sensor assembly measures a driving thrust force applied to a rotating shaft. The sensor assembly includes a hollow torque-shaft and a thrust shaft partially received within the hollow torque-shaft. The thrust force is exerted against the thrust shaft, which translates the force into a twisting force applied to the hollow torque-shaft. The sensor assembly can determine the amount of the thrust force by measuring the twist exerted on the hollow torque-shaft. The sensor does not impose upper or lower limits on rotational speed, which makes the sensor suitable for use in both rotary and static applications.

In one disclosed embodiment, a magnetoelastic element is mounted about an outer circumference of the hollow torque-shaft. A magnetometer is mounted to a non-rotating structure and cooperates with the magnetoelastic element to determine the amount of twist. The non-rotating structure can be separately mounted relative to the torque-shaft or could be mounted to the torque-shaft via a bearing. The use of the bearing would permit rotation of the torque shaft while maintaining correct positional registration of the magnetometer above the magnetoelastic element. The magnetometer would need some contact to a non-rotating structure to provide some level of friction to offset the bearing's friction so that the magnetometer does not rotate with the shaft. The magnetoelastic element generates a magnetic response to the twisting force on the torque shaft, applied by the thrust shaft, and the magnetometer provides a non-contacting electrical signal interface for the magnetic response. The sensor assembly preferably generates a feedback control signal that is transmitted to a system electronic control unit.

In one disclosed embodiment, the thrust shaft and hollow torque-shaft are locked together for rotation about a common axis. The thrust shaft includes a first lock component and the hollow torque-shaft includes a second lock component that interacts with the first lock component to secure the shafts together. The first lock component preferably comprises a plurality of keys formed about an outer circumference of the thrust shaft and the second lock component preferably comprises a plurality of keyways formed about an inner circumference of the hollow torque-shaft. The keys are received within the keyways to lock the shafts together. Preferably, the length of the keyways is slightly greater than the length of the keys to permit a small amount of axial movement between the thrust shaft and the hollow torque-shaft.

The sensor assembly also includes a translation component that translates the thrust force into a twisting force. The translation component includes a first member supported by the thrust shaft and a second member supported by the hollow torque-shaft. The first and second members cooperate to translate the thrust force exerted against the thrust shaft into the torque applied to the hollow torque-shaft. Preferably, the first member comprises a plurality of helical spline recesses formed about the outer circumference of the thrust shaft and the second member comprises a plurality of corresponding tab projections that are formed about the inner circumference of the hollow torque-shaft. The tab projections are received within the recesses such that as a linear thrust force is applied to the thrust shaft, the projections react against walls of the recesses to exert a twisting force on the hollow torque-shaft.

The subject invention provides a non-contact sensor that can measure thrust forces on a rotating shaft while operating under harsh environmental conditions. These and other features of the present invention can be best understood from the following specification and drawings, the following of which is a brief description.

DETAILED DESCRIPTION OF THE PREFERRED EMBODIMENT

Figure 1:
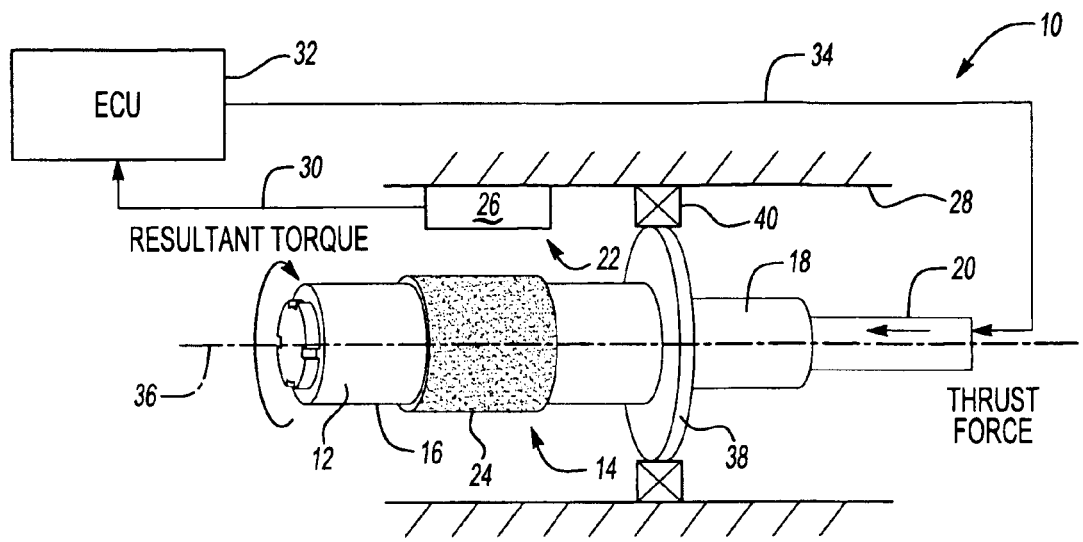
FIG. 1 is a perspective view of the sensor assembly incorporating the subject invention.

A non-contact sensor assembly for measuring driving in-line thrust forces is shown generally at 10 in FIG. 1. The sensor assembly 10 includes a hollow torque-shaft 12 that supports a first non-contact sensor component 14 on an outer surface 16. The sensor assembly 10 also includes a thrust shaft 18 that is inserted at least partially within the hollow torque-shaft 12. A thrust component 20 applies a thrust force to the thrust shaft 18. The thrust shaft 18 translates the thrust force into a twisting force, i.e. torque, which is applied to the hollow torque-shaft 12. A second non-contact sensor component 22 cooperates with the first non-contact sensor component to determine the amount of twist exerted on the hollow torque-shaft 12. From this twist measurement, the amount of thrust force that is applied to the thrust shaft 18 can be determined by known mathematical relationships.

In one disclosed embodiment, the first non-contact sensor component 14 comprises a magnetoelastic element, strip, or band 24 that is mounted or formed about the outer circumference of the hollow torque-shaft 12. The second non-contact sensor component 22 comprises a magnetometer 26 that is mounted to a non-rotating structure 28. The non-rotating structure 28 can be separately mounted relative to the torque-shaft 12 or could be mounted to the torque-shaft 12 via a bearing (not shown). The use of the bearing would permit rotation of the torque-shaft 12 while maintaining correct positional registration of the magnetometer 26 above the magnetoelastic element 24. The magnetometer 26 needs some contact to the non-rotating structure 28 to provide some level of friction to offset the bearing's friction so that the magnetometer 26 does not rotate with the torque-shaft 12.

The magnetoelastic element 24 generates a magnetic response, i.e. magnetic force field, which varies as the torque applied to the hollow torque-shaft 12 varies. The magnetometer 26 provides a non-contacting electrical signal interface with the magnetoelastic element 24 that monitors and measures the varying magnetic field. The magnetometer 26 is positioned in a spaced apart, overlapping relationship to the magnetoelastic element 24, and does not rotate. This provides a closed loop control system.

Examples of the materials and processes that form the magnetoelastic element 24 are set forth in U.S. Pat. No. 6,598,491, U.S. Pat. No. 6,516,508, U.S. Pat. No. 6,330,833, and U.S. Pat. No. 5,889,215 which are assigned to the assignee of the subject invention. This process results in a steadfast attachment mechanism that is comparable to welding. When the process is performed correctly, the material for the magnetoelastic element can only be removed from the substrate by a machining operation. Compare this to stain gauges that are glued onto the substrate, and which easily delaminate or separate causing a breakdown in the transference of stresses. Separation of sensing elements from the substrate is a primary failure mechanism for traditional thrust sensors that rely on force-induced deflection. Further, the magnetoelastic element 24 made by this process is highly resistant to corrosion. Thus, the subject invention provides a more robust design compared to existing sensors and can withstand excursions beyond full scale measurement ranges, in addition to being able to operate in harsh environmental conditions.

The magnetometer 26 and magnetoelastic element 24 cooperate to either directly indicate the amount of the thrust force or to measure the torque, which is transmitted to a system electronic control unit (ECU) 32. ECU 32 utilizes software or other comparable analysis methods to then determine the thrust force exerted on the thrust shaft 18 based on the torque measurement. The magnetometer 26 and magnetoelastic element 24 cooperate to generate a feedback control signal 30. The ECU 32 can then modify a control signal 34, as needed, to adjust application of the thrust force via the thrust component 20.

Any type of magnetoelastic sensing material can be used to form the magnetoelastic element 24. Preferably, the magnetoelastic element 24 is similar to a magnetoelastic element used in torque sensors currently produced by Siemens VDO Automotive Corporation.

The hollow torque-shaft 12 and thrust shaft 18 are locked together for rotation about a common axis 36. The hollow torque-shaft 12 preferably includes a mounting flange 38 that supports a thrust bearing 40. The thrust bearing 40 mounts the shafts 12, 18 for free rotation relative to the non-rotating structure 28. The mounting flange 38 is preferably a circular flange that surrounds the outer circumference of the hollow torque-shaft 12.

Figure 2:
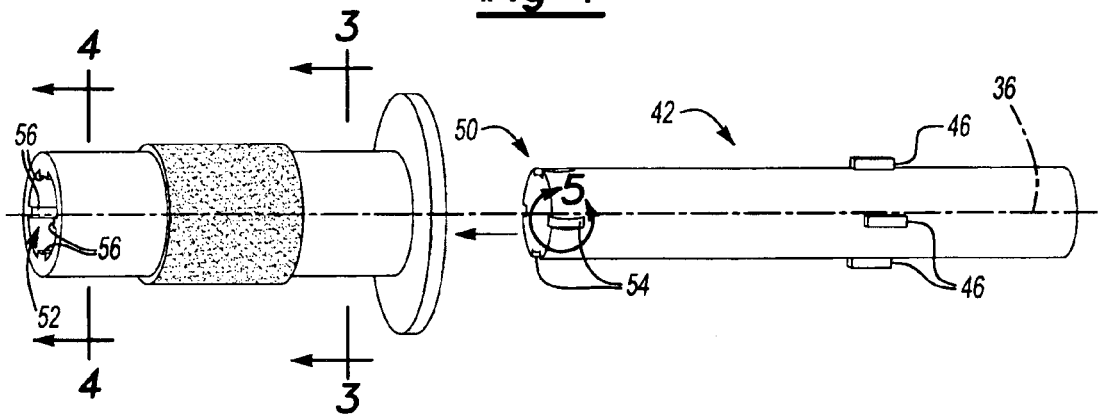
FIG. 2 is a partial exploded view of the sensor assembly of FIG. 1.
Figure 3:
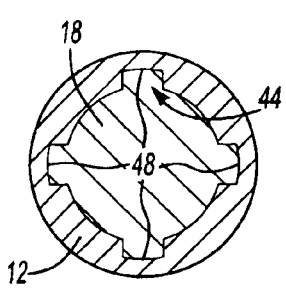
FIG. 3 is a cross-sectional view taken along line 3—3 of FIG. 2.
Figure 4:
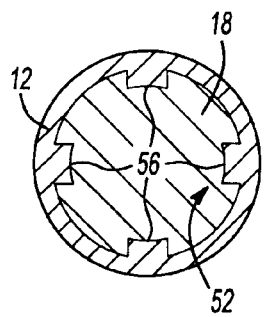
FIG. 4 is a cross-sectional view taken along line 4—4 of FIG. 2.

The sensor assembly 10 includes a locking assembly that serves to lock the hollow torque-shaft 12 and thrust shaft 18 together. As shown in FIG. 2, the locking assembly includes a first component 42 supported by the thrust shaft 18 and a second component 44 supported by the hollow torque-shaft 12 (see FIG. 3). Preferably, the first component 42 comprises a plurality of keys 46 formed about an outer circumference of the thrust shaft 18 and the second component 44 comprises a plurality of keyways 48 formed about an inner circumference of the hollow torque-shaft 12. The opposite configuration could also be used, i.e. keyways 48 formed on the thrust shaft 18 and keys 46 formed on the hollow torque-shaft 12. The keys 46 are received within the keyways 48 to lock the shafts 12, 18 together. Preferably the length of the keyways 48 is longer than the length of the keys 46 to permit a small, predetermined amount of axial movement between the thrust shaft 18 and the hollow torque-shaft 12.

Further, the keys 46 and keyways 48 are preferably positioned closer to the mounting flange 38 area of the torque-shaft 12, and are not positioned under the magnetoelastic element 24. If the keys 46 and keyways 48 intrude underneath the magnetoelastic element 24, the torque induced stresses in the magnetoelastic material would be inhomogeneous resulting in a "bumpy" magnetic field. As the torque-shaft 12 rotates, the "bumpy" magnetic field would incorrectly be interpreted as fluctuations in torque.

The sensor assembly 10 also includes a translation assembly that serves to translate the linear thrust force applied to the thrust shaft 18 into a twisting force exerted against the hollow torque-shaft 12. The translation assembly includes a first component 50 formed on the thrust shaft 18 and a second component 52 formed on the hollow torque-shaft 46. Preferably, the first component 50 comprises a plurality of curved recesses 54 formed about the outer circumference of the thrust shaft 18 and the second component 52 comprises a plurality of corresponding projections 56 formed about the inner circumference of the hollow torque-shaft 12. The opposite configuration could also be used, i.e. projections 56 formed on the thrust shaft 18 and recesses 54 formed on the hollow torque-shaft 12. The projections 56 are received within the recesses 54 to transmit the linear thrust force into a torque.

Figure 5:
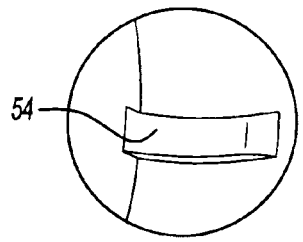
FIG. 5 is a magnified view encircled by 5 of FIG. 2.

As shown in FIG. 5, the recesses 54 are preferably helical or spiral shaped. In other words, the recesses 54 are preferably defined by a three-dimensional curve that turns around the axis 36 at a constant or continuously varying distance while moving parallel to the axis 36. The projections 56 preferably are formed with a corresponding helical or spiral shape. This helical shape translates the minute displacement caused by the thrust force into torque applied to the hollow torque-shaft 12.

Figure 6:
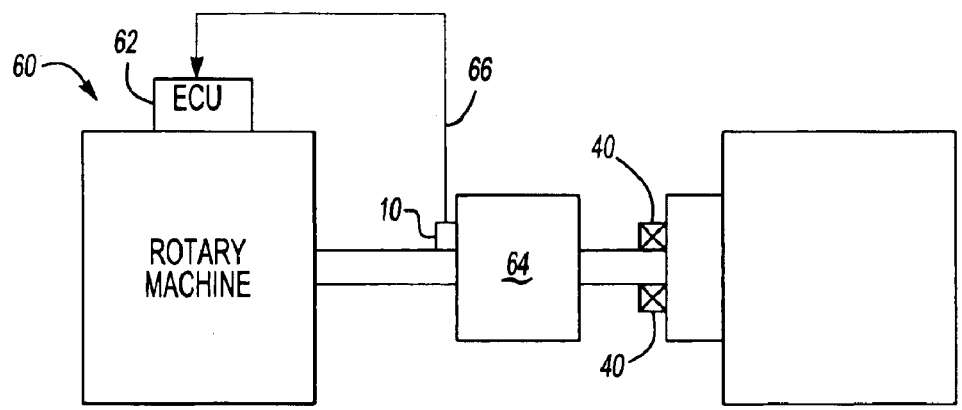
FIG. 6 is a schematic illustration of the sensor assembly of FIG. 1 incorporated into a rotary machine application.

The sensor assembly 10 can be used in many different system applications. As shown in FIG. 6, the sensor assembly 10 can be used in a rotary machine 60 that supports rotating work pieces, as is the case with a lathe; or rotating tool heads such as drill presses or milling machines, for example. A machine ECU 62 controls compression or drawing forces applied to a work piece 64. The sensor assembly 10 either determines the amount of thrust force itself or measures the torque, which is then used by the ECU 62 to determine the amount of thrust force. The sensor assembly 10 thus generates a feedback control signal 66 that is transmitted to the system ECU 62, which can adjust system controls as needed.

Figure 7:
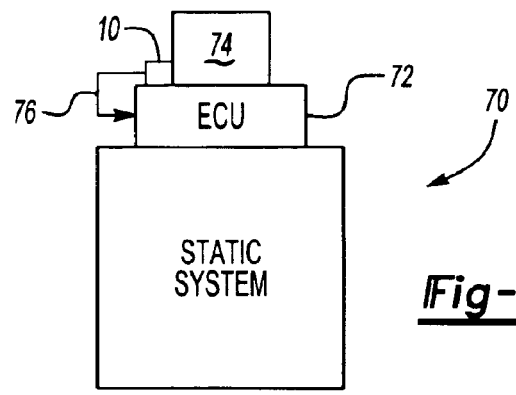
FIG. 7 is a schematic illustration of the sensor assembly of FIG. 1 incorporated into a static system application.

As shown in FIG. 7, the sensor assembly 10 could also be used in a static machine system 70 that compresses and/or draws a work piece. The sensor assembly 10 would operate in a manner similar to that described above with regard to a rotary machine 60. A system ECU 72 controls thrust forces applied to a work piece 74. The sensor assembly 10 generates a feedback control signal 76 to adjust applied thrust forces as needed.

Figure 8:
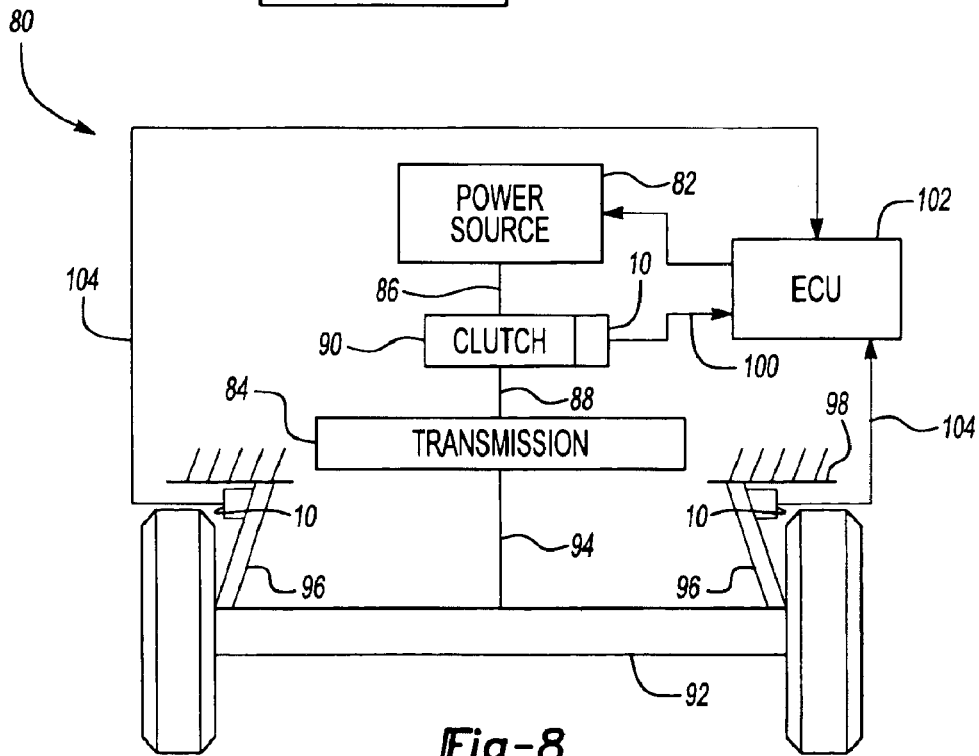
FIG. 8 is a schematic illustration of the sensor assembly of FIG. 1 incorporated into a vehicle component application.

As shown in FIG. 8, the sensor assembly 10 could also be used in a vehicle 80. The vehicle 80 includes a power source 82 such as an engine or electric motor and a transmission 84. The power source 82 supplies an output torque via an output shaft 86. The output shaft 86 is coupled to a transmission input shaft 88 with a clutch assembly 90. Output torque is supplied to an axle assembly 92 via an output shaft 94. Suspension components 96, such as shock absorbers for example, mount the axle assembly 92 to a vehicle frame 98 to provide for a more comfortable ride.

The sensor assembly 10 can be used at various locations within the vehicle. For example, the sensor assembly 10 could be used to measure the thrust force compressing the clutch 90. This would supply data concerning the degree of clutch engagement, clutch coupling characteristics, and power transfer characteristics. The sensor 10 generates a feedback control signal 100 that is transmitted to a system ECU 102. The ECU 102 can then provide engine control compensation as needed to better control clutch engagement.

Also, for example, the sensor assembly 10 could be used to measure thrust forces exerted on the suspension components 96. In this configuration, the sensor assembly 10 generates a ride feedback control signal 104 that is sent to the system ECU 102. The ECU 102 can then provide ride stabilizing compensation as needed. The sensor assembly 10 would preferably be incorporated into suspension struts and thrust forces could be measured and used to control shock absorber stiffness.

Other possible applications include traction control systems (e.g. on-demand 4-wheel drive systems) and brake-by-wire. Pressure feedback from rotating clutches in a transfer case would provide a control variable corresponding to a degree of engagement which would improve traction control. In brake-by-wire configuration, the thrust force applied to a brake pedal by the drive is translated into an electrical signal for managing braking in accordance with a control algorithm.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sensor assembly comprising:
   a hollow torque-shaft including a first non-contact sensor component mounted to an outer surface;
   a thrust shaft at least partially received within said hollow torque-shaft and including at least one translation member that converts a driving in-line thrust force applied to said thrust shaft into a twisting force applied to said hollow torque-shaft and said first non-contact sensor component; and
   a second non-contact sensor component supported by a non-rotating structure and cooperating with said first non-contact sensor component to measure said thrust force.

2. The sensor assembly of claim 1 wherein said first non-contact sensor component comprises a magnetoelastic element and said second non-contact sensor component comprises a magnetometer, said magnetoelastic element generating a magnetic response representative of said twisting force with said magnetometer providing an electrical signal interface for said magnetic response.

3. The sensor assembly of claim 1 including an electronic control unit generating control signals for a system component wherein said first and second non-contact sensor components cooperate to generate a feedback control signal that is transmitted to said electronic control unit.

4. The sensor assembly of claim 3 wherein said system component comprises a rotary machine component.

5. The sensor assembly of claim 3 wherein said system component comprises a static machine component.

6. The sensor assembly of claim 3 wherein said system component comprises a vehicle component.

7. The sensor assembly of claim 1 wherein said at least one translation member comprises at least one first member formed on an outer surface of said thrust shaft and wherein said hollow torque-shaft includes at least one corresponding second member formed on an inner surface of said hollow torque-shaft, said first and second members cooperating to translate said thrust force into said twisting force.

8. The sensor assembly of claim 7 wherein said at least one first member comprises a plurality of curved recesses formed about the circumference of the outer diameter of said thrust shaft and said at least one second member comprises a plurality of projections formed about the circumference of the inner diameter of said hollow torque-shaft with each one of said projections being received within a corresponding one of said recesses.

9. The sensor assembly of claim 1 including a locking mechanism having a first lock component supported by said thrust shaft and a second lock component supported by said hollow torque-shaft wherein said first and second lock components cooperate to lock said thrust shaft and said hollow torque-shaft together for rotation about a common axis.

10. The sensor assembly of claim 9 wherein said first lock component comprises a plurality of keys formed about the outer circumference of said thrust shaft and said second lock component comprises a plurality of keyways formed about the inner circumference of said hollow torque-shaft with each one of said keys being received within a corresponding one of said keyways.

11. The sensor assembly of claim 10 wherein the length of said keyways is greater than the length of said keys to permit a predetermined amount of axial movement between said thrust shaft and said hollow torque-shaft.

12. The sensor assembly of claim 9 including a thrust bearing mounted between said hollow torque-shaft and said non-rotating structure to permit said hollow torque-shaft and said thrust shaft to freely rotate relative to said non-rotating structure.

13. The sensor assembly of claim 12 wherein said hollow torque-shaft includes a mounting flange for supporting a thrust bearing race.

14. A sensor assembly comprising:
   a hollow torque-shaft including a magnetoelastic element surrounding an outer circumference of said hollow torque shaft;
   a thrust shaft at least partially received within said hollow torque-shaft;
   a locking component having a first lock member supported by said hollow torque-shaft and a second lock member supported by said thrust shaft, said first and second lock members cooperating to lock said thrust shaft and said hollow torque-shaft together for rotation about a common axis;
   a translation component having a first translation member supported by said hollow torque-shaft and a second translation member supported by said thrust shaft, said first and second translation members cooperating to convert a driving in-line thrust force applied to said thrust shaft into a twisting force applied to said hollow torque-shaft and said magnetoelastic element; and
   a magnetometer supported by a non-rotating structure and cooperating with said magnetoelastic element to measure the amount of said twisting force generated by said thrust force.

15. The assembly of claim 14 wherein said first translation member comprises a plurality of projections formed about the circumference of the inner diameter of said hollow torque-shaft and said second translation member comprises a plurality of curved recesses formed about the circumference of the outer diameter of said thrust shaft with each one of said projections being received within a corresponding one of said recesses to translate said thrust force applied to said thrust shaft into said twisting force applied to said hollow torque-shaft.

16. The assembly of claim 14 wherein said first lock member comprises a plurality of keyways formed about the inner circumference of said hollow torque-shaft and said second lock member comprises a plurality of keys formed about the outer circumference of said thrust shaft with each one of said keys being received within a corresponding one of said keyways.

17. The sensor assembly of claim 16 wherein the length of said keyways is greater than the length of said keys to permit a predetermined amount of axial movement between said thrust shaft and said hollow torque-shaft.

18. A method for measuring thrust force comprising the steps of:
   (a) applying an in-line driving thrust force to a thrust shaft;
   (b) translating the in-line driving thrust force into a torque;
   (c) applying the toque to a hollow torque-shaft; and
   (d) measuring the torque with a non-contact sensor assembly to determine the thrust force.

19. The method of claim 18 including the steps of inserting the thrust shaft at least partially within the hollow torque-shaft and locking the thrust shaft and hollow torque-shaft together for rotation about a common axis.

20. The method of claim 19 including the steps of mounting a magnetoelastic element about an outer circumference of the hollow torque-shaft, mounting a magnetometer to a non-rotating structure with the magnetoelastic element and magnetometer cooperating to form the non-contact sensor assembly, generating a magnetic response representative of the torque with the magnetoelastic element, and providing an electrical signal interface for the magnetic response with the magnetometer.

* * * * *